(12) United States Patent
Baik et al.

(10) Patent No.: US 11,639,733 B2
(45) Date of Patent: May 2, 2023

(54) DUAL ROD POSITIONING STRUCTURE (71) Applicant: LUHUA (XIAMEN) TRADING CO., LTD., Fujian (CN)

(72) Inventors: Kwang ho Baik, Seoul (KR); Renhua Chen, Xiamen (CN)

(73) Assignee: CAMPVALLEY (XIAMEN) CO., LTD., Fujian (CN)

( * ) Notice: Subject to any disclaimer, the term of this patent is extended or adjusted under 35 U.S.C. 154(b) by 326 days.

(21) Appl. No.: 17/253,622

(22) PCT Filed: Apr. 3, 2019

(86) PCT No.: PCT/CN2019/081176
§ 371 (c)(1),
(2) Date: Dec. 18, 2020

(87) PCT Pub. No.: WO2019/242371
PCT Pub. Date: Dec. 26, 2019

(65) Prior Publication Data
US 2021/0262505 A1 Aug. 26, 2021

(30) Foreign Application Priority Data

Jun. 20, 2018 (CN) .......................... 201810636029
Nov. 19, 2018 (CN) .......................... 201811375665

(51) Int. Cl.
*E04H 15/60* (2006.01)
*F16B 7/10* (2006.01)
*E04H 15/50* (2006.01)

(52) U.S. Cl.
CPC ............... *F16B 7/10* (2013.01); *E04H 15/60* (2013.01); *E04H 15/50* (2013.01)

(58) Field of Classification Search
CPC .................................. F16B 7/10; E04H 15/60
See application file for complete search history.

(56) References Cited

U.S. PATENT DOCUMENTS

| 6,551,226 B1* | 4/2003 | Webber | F16B 7/105 |
| | | | 482/148 |
| 7,637,276 B2* | 12/2009 | Mallookis | E04H 15/50 |
| | | | 135/144 |
| 9,828,788 B2* | 11/2017 | Zhou | E04H 15/48 |
| 2006/0051159 A1* | 3/2006 | Tsai | F16B 7/105 |
| | | | 403/109.3 |
| 2007/0012346 A1* | 1/2007 | Choi | F16B 7/105 |
| | | | 135/120.3 |
| 2014/0030012 A1* | 1/2014 | Lee | F16B 7/105 |
| | | | 403/326 |
| 2021/0172194 A1* | 6/2021 | Baik | F16B 7/105 |

* cited by examiner

*Primary Examiner* — Noah Chandler Hawk
(74) *Attorney, Agent, or Firm* — Leong C. Lei (57) ABSTRACT

A dual rod positioning structure, for connecting and fixing two single rods sleeved on or inserted into one another, includes positioning holes respectively located on rod bodies of the two single rods and a positioning seat capable of being engagedly fixed to the positioning holes and sleeved on the single rods. The positioning holes are arranged on two adjacent sidewalls of the single rods. Inserted into the positioning seat are a positioning element selectively engaged in the positioning holes, a spring, a positioning pin and an outward protruding button. The positioning structure overall is structurally simple, convenient to assemble, and stable in terms of positioning.

4 Claims, 7 Drawing Sheets

DUAL ROD POSITIONING STRUCTURE

BACKGROUND OF THE INVENTION

1. Field of the Invention

The present invention relates to a rod, and more particularly to a dual rod positioning structure.

2. Description of the Prior Art

In the prior art, in order to facilitate the carrying and use of larger rods, the rods are usually divided into multiple single rods with different diameters. The diameters of the single rods are successively reduced. One single rod with a small diameter is inserted into the other single rod with a large diameter. The single rods are often positioned and connected by a positioning structure. For example, the upright rod of a common foldable tent is usually formed by two single rods connected and positioned by a positioning structure. The positioning structure usually includes a spring located in the small-diameter single rod, a positioning structure and a through hole located in the large-diameter single rod. The head end of the spring is connected to the positioning structure and placed in the small-diameter single rod. A protrusion is provided on the positioning structure. The positioning structure is confined in the small-diameter single rod. Under normal circumstances, the protrusion will extend out of the small-diameter single rod. When the small-diameter single rod is inserted into the large-diameter single rod, it will push the protrusion, causing the protrusion to be retracted into the small-diameter single rod and to compress the spring. When the protrusion of the small-diameter single rod moves to the through hole of the large-diameter single rod, the spring will make the protrusion extend outward to enter the through hole, thereby realizing the positioning of the small-diameter single rod and the large-diameter single rod. When the protrusion is pressed to disengage from the through hole, the positioning of the small-diameter single rod and the large-diameter single rod is released.

Therefore, although the positioning operation of the small-diameter single rod and the large-diameter single rod is simple, but in order to facilitate assembly, there will be a certain gap between the small-diameter single rod and the large-diameter single rod. This affects the positioning stability of the small-diameter single rod and the large-diameter single rod, and the head end of the spring needs to be connected to the positioning structure and placed in the upright rod, which is complicated for assembly.

Accordingly, the inventor of the present invention has devoted himself based on his many years of practical experiences to solve these problems.

SUMMARY OF THE INVENTION

The primary object of the present invention is to provide a dual rod positioning structure that is structurally simple, convenient to assemble, and stable in terms of positioning.

In order to achieve the above object, the present invention adopts the following solutions.

A dual rod positioning structure, for connecting and fixing two single rods insertedly connected to each other, comprises positioning holes respectively located on rod bodies of the two single rods and a positioning seat capable of being engaged with and fixed to the positioning holes and sleeved on the single rods. The positioning holes are arranged on two adjacent sidewalls of the single rods. The positioning seat includes a positioning element selectively engaged in the positioning holes, a spring, a positioning pin and an outward protruding button therein. The positioning pin runs inward through the positioning seat and through the positioning element. An engaging groove is provided on an end surface of the button facing the positioning element. One end of the positioning element is engaged in the engaging groove. One end of the spring is abutted against the button. Another end of the spring is abutted against an inner wall of the positioning seat.

The positioning element is an elongated bar.

The single rods are rectangular rods, and the positioning element is ∧-shaped.

A further positioning pin is provided between the button and the positioning element, and the end of the positioning element has a slot for limiting movement of the further positioning pin.

After adopting the above technical solutions, the dual rod positioning structure of the present invention is designed through the structure of the positioning seat and the single rods. When in use, the positioning element of the positioning seat is engaged in the positioning hole of the large-diameter single rod. Then, the button of the positioning seat is pressed, and the button links the positioning element that is engaged in the engaging groove of the button to slightly tilt up with the positioning pin as the fulcrum. After that, the small-diameter single rod is inserted in the large-diameter single rod, and the button is released. At this time, the positioning element abuts against the rod body of the small-diameter single rod. The small-diameter single rod is further moved until the positioning holes of the two single rods are aligned with each other. At this time, under the elastic force of the spring of the positioning seat, the positioning element is engaged in the positioning hole of the small-diameter single rod, thereby realizing the connection of the two single rods. When it is necessary to release the connection of the two single rods, only the button of the positioning seat is required to be pressed, so that the button links the positioning element that is engaged in the engaging groove of the button to completely tilt up with the positioning pin as the fulcrum. Therefore, the small-diameter single rod can be pulled down smoothly, so that the positioning holes of the two single rods are no longer aligned with each other. That is, the positioning element is disengaged from the positioning hole to release the two single rods. Therefore, the present invention realizes the positioning of the two single rods through the cooperation of the positioning element of the positioning seat and the positioning holes of the single rods, and the rod bodies of the two single rods of the present invention can be fitted tightly. Compared with the conventional positioning structure, the overall structure of the present invention is simple, easy to assemble and stable in positioning.

DETAILED DESCRIPTION OF THE PREFERRED EMBODIMENTS

Embodiments of the present invention will now be described, by way of example only, with reference to the accompanying drawings.

Referring to FIG. 1 through FIG. 7, the present invention discloses a dual rod positioning structure for connecting and fixing two single rods 02 insertedly connected to each other. One single rod 02 with a small diameter is inserted into the other single rod 02 with a large diameter. The dual rod positioning structure comprises positioning holes 01 respectively located on rod bodies of the two single rods 02 and a positioning seat 12 capable of being engaged with and fixed to the positioning holes 01 and sleeved on the single rods 02. The positioning holes 01 are arranged on two adjacent sidewalls of the single rods 02. The positioning seat 12 includes a positioning element 121 selectively engaged in the positioning holes 01, a spring 122, a positioning pin 123 and an outward protruding button 124 therein. The positioning pin 123 runs inward through the positioning seat 12 and through the positioning element 121. An engaging groove 125 is provided on an end surface of the button 124 facing the positioning element 121. One end of the positioning element 121 is engaged in the engaging groove 125. One end of the spring 122 is abutted against the button 124. The other end of the spring 122 is abutted against the inner wall of the positioning seat 12.

Figure 2:
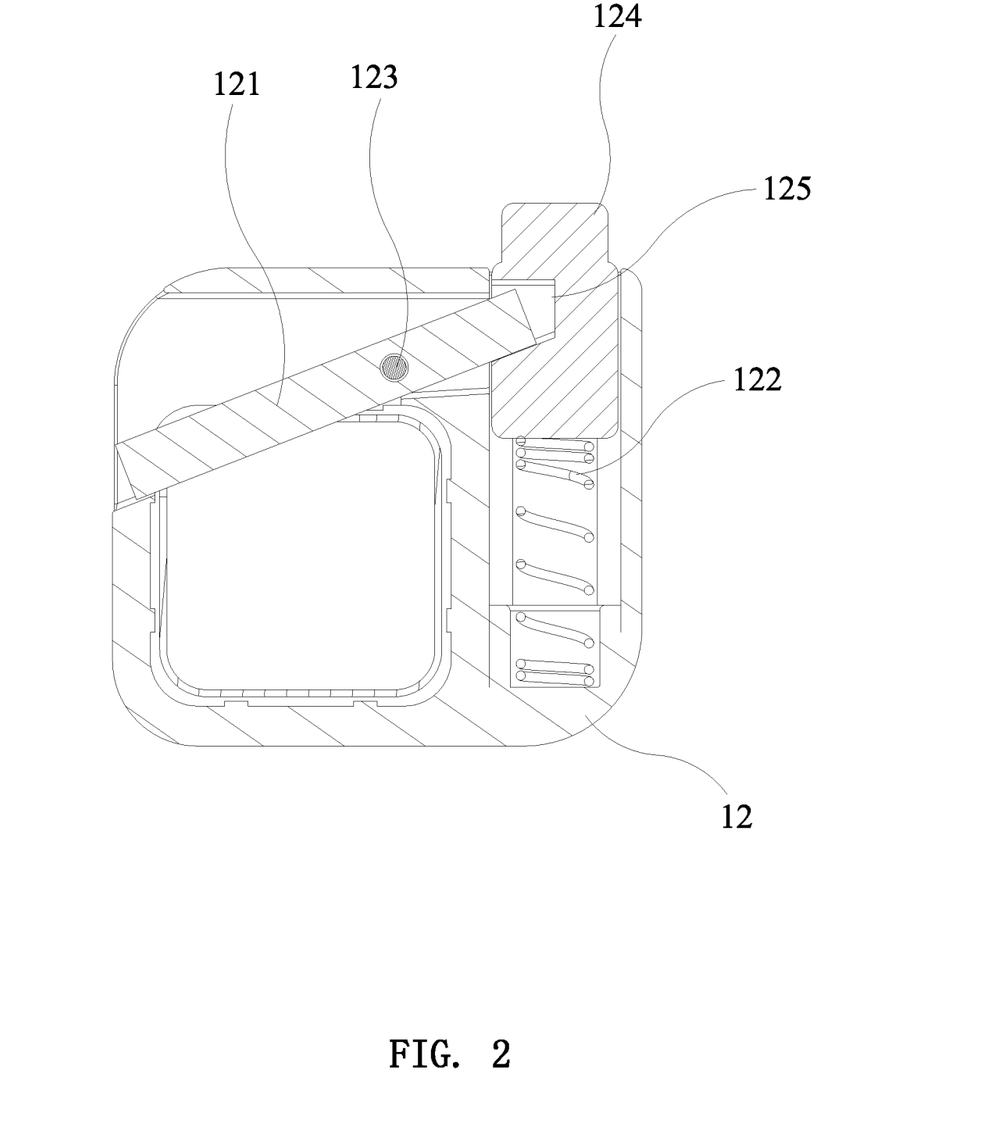
FIG. 2 is a first cross-sectional view of a first embodiment of the positioning seat of the present invention.
Figure 3:
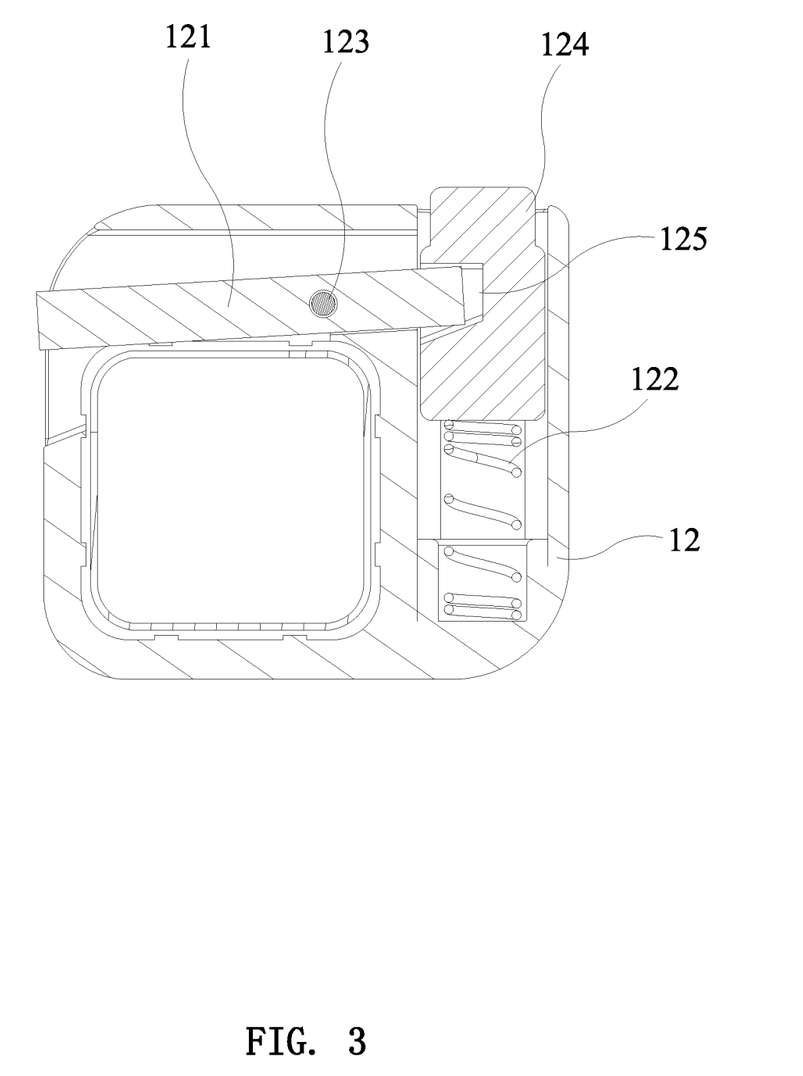
FIG. 3 is a second cross-sectional view of the first embodiment of the positioning seat of the present invention.
Figure 4:
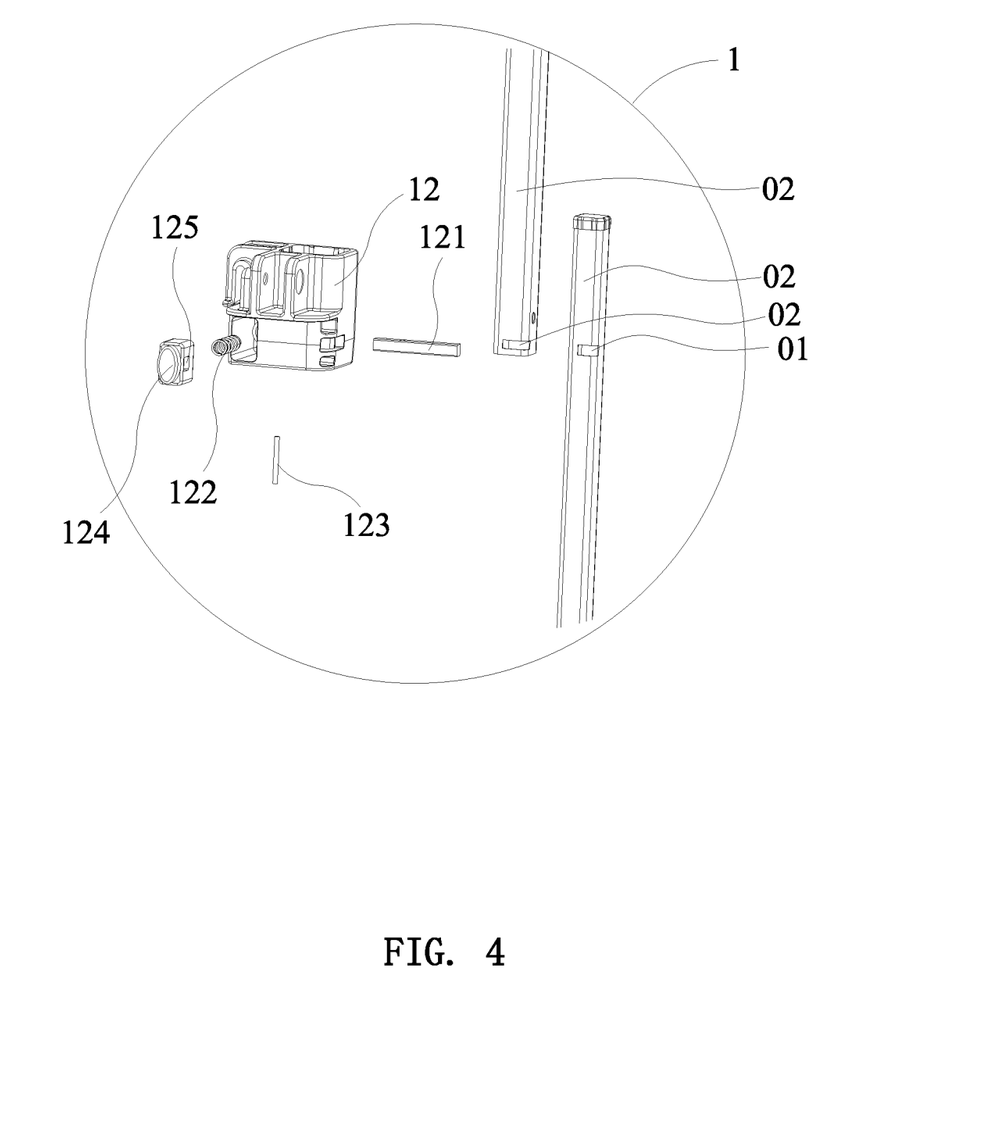
FIG. 4 is an exploded schematic view of the first embodiment of the positioning seat shown in FIG. 2 and FIG. 3.
Figure 5:
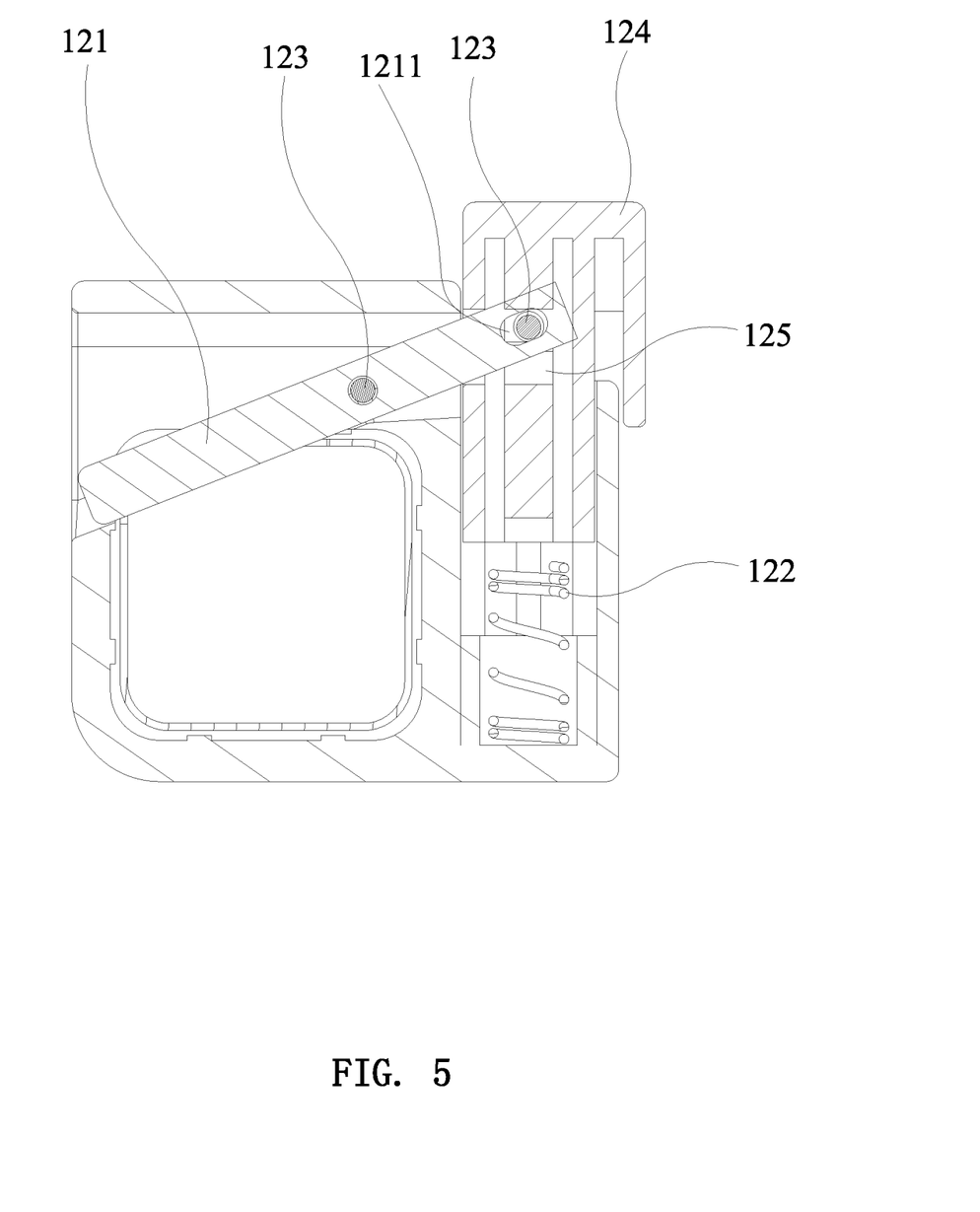
FIG. 5 is a first cross-sectional view of a second embodiment of the positioning seat of the present invention.
Figure 6:
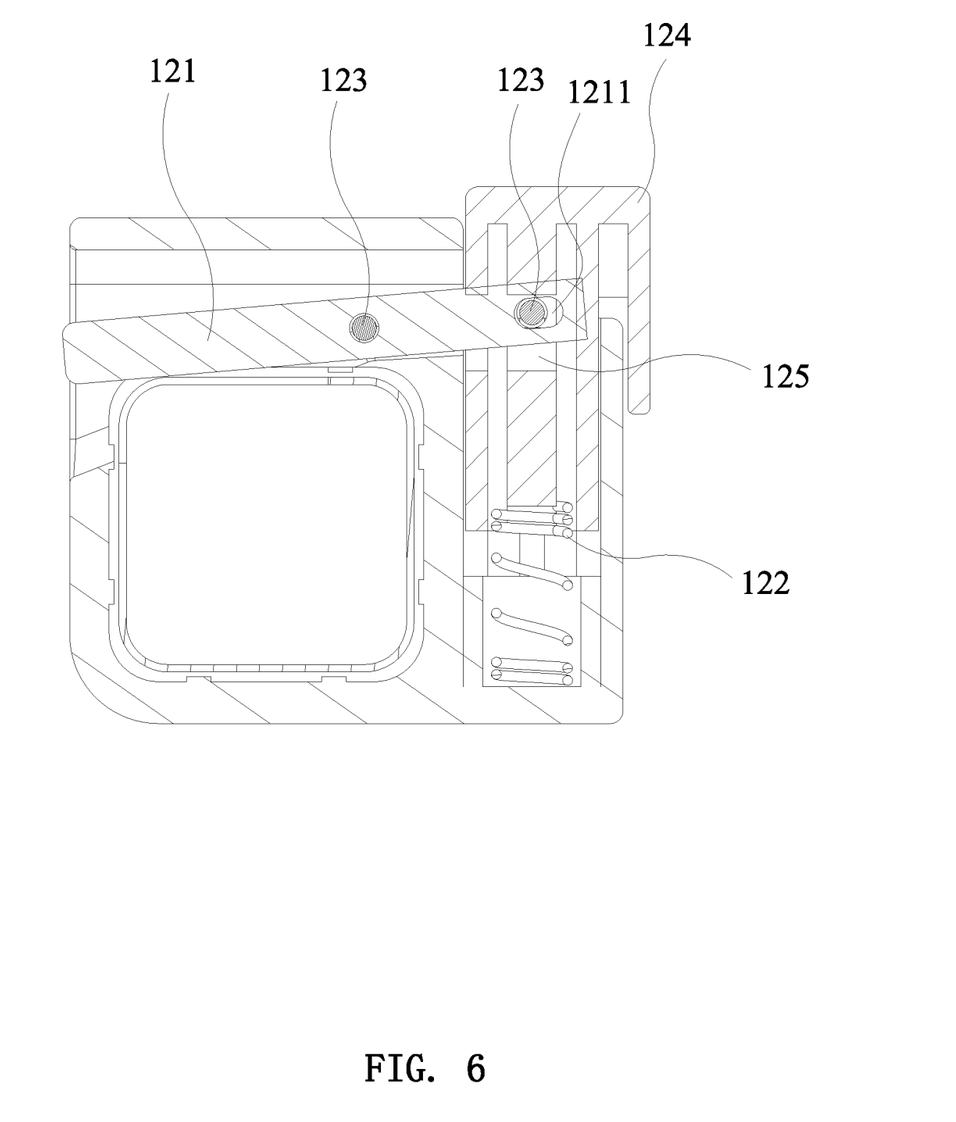
FIG. 6 is a second cross-sectional view of the second embodiment of the positioning seat of the present invention.
Figure 7:
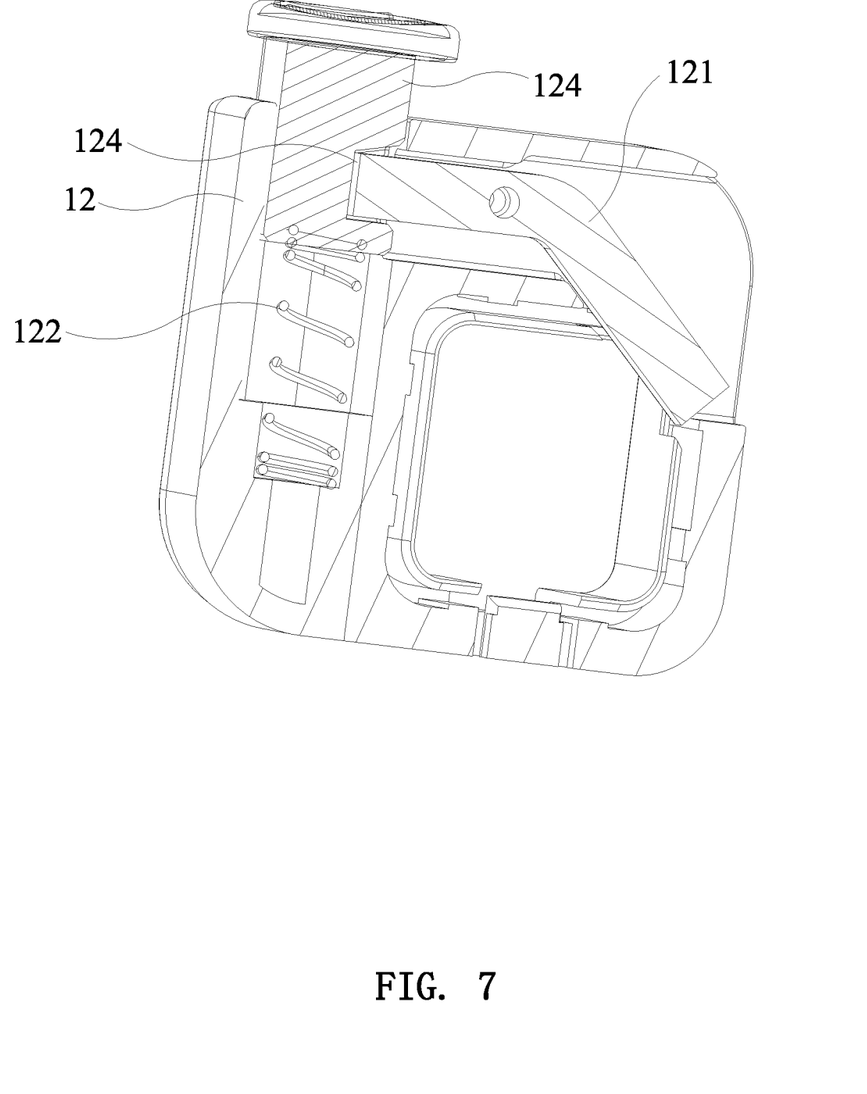
FIG. 7 is a cross-sectional view of a third embodiment of the positioning seat of the present invention.

Please refer to FIG. 2 in cooperation with FIG. 3 and FIG. 4, or refer to FIG. 5 in cooperation with FIG. 6, or refer to FIG. 7. The dual rod positioning structure of the present invention is designed through the structure of the positioning seat 12 and the single rods 02. When in use, the positioning element 121 of the positioning seat 12 is engaged in the positioning hole 01 of the large-diameter single rod 02. Then, the button 124 of the positioning seat 12 is pressed, and the button 124 links the positioning element 121 that is engaged in the engaging groove 125 of the button 124 to slightly tilt up with the positioning pin 123 as the fulcrum. After that, the small-diameter single rod 02 is inserted in the large-diameter single rod 02, and the button 124 is released. At this time, the positioning element 121 abuts against the rod body of the small-diameter single rod 02. The small-diameter single rod 02 is further moved until the positioning holes 01 of the two single rods 02 are aligned with each other. At this time, under the elastic force of the spring 122 of the positioning seat 12, the positioning element 121 is engaged in the positioning hole 01 of the small-diameter single rod 02, thereby realizing the connection of the two single rods 02. When it is necessary to release the connection of the two single rods 02, only the button 124 of the positioning seat 12 is required to be pressed, so that the button 124 links the positioning element 121 that is engaged in the engaging groove 125 of the button 124 to completely tilt up with the positioning pin 123 as the fulcrum. Therefore, the small-diameter single rod 02 can be pulled down smoothly, so that the positioning holes 01 of the two single rods 02 are no longer aligned with each other. That is, the positioning element 121 is disengaged from the positioning hole 01 to release the two single rods 02. Therefore, the present invention realizes the positioning of the two single rods 02 through the cooperation of the positioning element 121 of the positioning seat 12 and the positioning holes 01 of the single rods 02, and the rod bodies of the two single rods 02 of the present invention can be fitted tightly. Compared with the conventional positioning structure, the overall structure of the present invention is simple, easy to assemble and stable in positioning.

In addition, FIGS. 2 to 4 show the first embodiment of the positioning seat of the present invention. In this embodiment, the positioning element 121 is an elongated bar. The difference between the second embodiment of the positioning seat of the present invention shown in FIG. 5 and FIG. 6 and the first embodiment is that another positioning pin 123 is provided between the button 124 and the positioning element 121. One end of the positioning element 121 has a slot 1211 for limiting the movement of the positioning pin 123, so that the button 124 and the positioning element 121 can be linked more stably and firmly. FIG. 7 shows the difference between the third embodiment of the positioning seat of the present invention and the first embodiment in that the single rods 02 are rectangular rods, and the positioning element 121 is ∧-shaped, so that the positioning of the positioning element 121 and the positioning hole 01 is firmer because the shape of the positioning element 121 is more similar to the shape of the positioning hole 01.

In addition, the present invention may be applied to the connection of the rods of the multi-section shaft of an umbrella, or may be applied to the connection of the single rods 02 of the multi-section upright rod 1 of a tent support, and may be applied to the connection of the rods of a multi-section table leg. In a word, the present invention may be applied to the connection of two single rods 02. The connection of the two single rods of the multi-section upright rod 1 used for the tent support of the present invention will be described as an example below.

Figure 1:
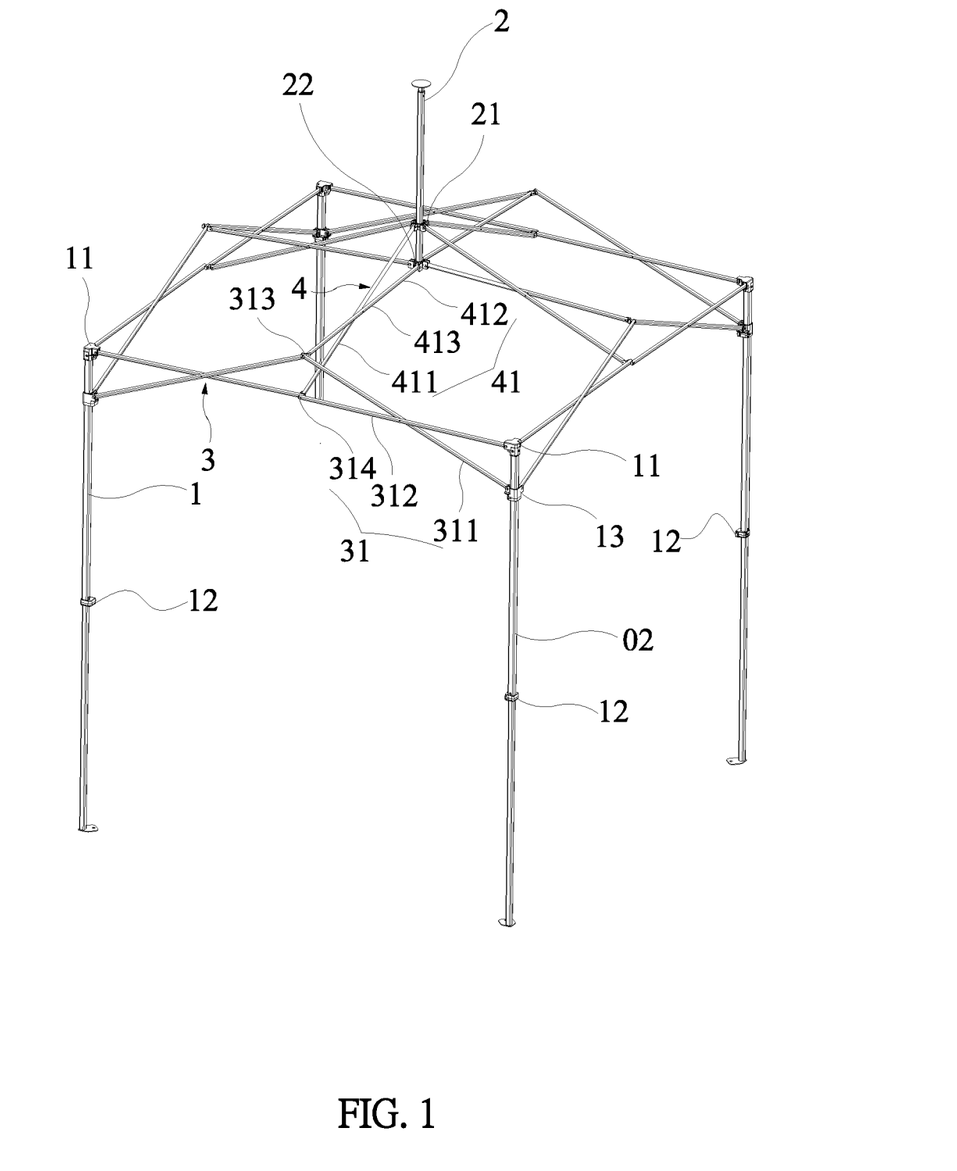
FIG. 1 is a schematic view of the use of the present invention.

FIG. 1 is a schematic view of the use of the present invention. The tent support in the figure includes a plurality of upright rods 1, a top module 2 in the center of the top of the tent, a plurality of side rod assemblies 3 each for connecting every adjacent two of the upright rods 1, and a plurality of top rod assemblies 4 for connecting the side rod assemblies 3 and the top module 2. A fixing seat 11 is installed on the top of the upright rod 1. A sliding seat 13 that can slide along the upright rod 1 to link the corresponding side rod assembly 3 and the corresponding top rod assembly 4 is installed on the rod body of the upright rod 1. The side rod assembly 3 is connected to the fixing seat 11. The top module 2 includes an upper runner 21 and a lower runner 22. Each side rod assembly 3 includes two link rod units 31 hinged at respective ends to each other. Each top rod assembly 4 includes a link rod unit 41. Each link rod unit 31 of each side rod assembly 3 includes two link rods 311, 312 that are hinged to each other and expanded into an "X" shape. The link rod unit 41 of each top rod assembly 4 includes a long rod 411 and a short rod 412 that are hinged to each other and expanded into an "X" shape. The first ends of the two link rods 311, 312 of the two link rod units 31 of each side rod assembly 3 are hinged to each other to form an upper hinge point 313 and a lower hinge point 314. The second ends of the two link rods 311, 312 of the two link rod units 31 of the side rod assembly 3 are hinged to the fixing seats 11 and the positioning seats 12 of the adjacent upright rods 1, respectively. One end of the long rod 411 of each top rod assembly 4 is hinged to the lower hinge point 314 of the corresponding side rod assembly 3, and the other end of the long rod 411 is hinged to the upper runner 21 of the top module 2. One end of the short rod 412 of each top rod assembly 4 is hinged to the upper hinge point 313 of the corresponding side rod assembly 3, and the other end of the short rod 412 is hinged to the lower runner 22 of the top module 2. The link rod unit 41 of each top rod assembly 4 is designed to include the long rod 411 and the short rod 412 that are hinged to each other and expanded into an "X" shape. The two single rods 02 of the upright rod 2 are connected to each other and positioned by the dual rod positioning structure of the present invention. The two single rods 02 are both provided with the positioning holes 01, and the positioning element 121 of the positioning seat 12 is configured to be engaged in the positioning holes 01 of the two single rods 02 to realize the connection of the two single rods 02.

What is claimed is:

1. A dual rod positioning structure for connecting and fixing two single rods insertedly connected to each other, comprising positioning holes respectively located on rod bodies of the two single rods and a positioning seat capable of being engaged with and fixed to the positioning holes and sleeved on the single rods, the positioning holes being arranged on two adjacent sidewalls of the single rods, the positioning seat including a positioning element selectively engaged in the positioning holes, a spring, a positioning pin and an outward protruding button therein, the positioning pin running inward through the positioning seat and through the positioning element, an engaging groove being provided on an end surface of the button facing the positioning element, one end of the positioning element being engaged in the engaging groove, one end of the spring being abutted against the button, another end of the spring being abutted against an inner wall of the positioning seat.

2. The dual rod positioning structure as claimed in claim 1, wherein the positioning element is an elongated bar.

3. The dual rod positioning structure as claimed in claim 1, wherein the single rods are rectangular rods, and the positioning element is ∧-shaped.

4. The dual rod positioning structure as claimed in claim 1, wherein a further positioning pin is provided between the button and the positioning element, and the end of the positioning element has a slot for limiting movement of the further positioning pin.

* * * * *